(12) United States Patent
Pack et al.

(10) Patent No.: US 10,236,484 B1
(45) Date of Patent: Mar. 19, 2019

(54) EMERGENCY LOCATOR TRANSMITTER (ELT) WITH SEPARATED OUTSIDE BATTERY PACK FOR SAFETY FROM BATTERY EVENT

(71) Applicants: Thomas Pack, Boca Raton, FL (US); William Cox, Sunrise, FL (US); Ricardo Raimondo, Lauderhill, FL (US); Santiago Contreras, Plantation, FL (US)

(72) Inventors: Thomas Pack, Boca Raton, FL (US); William Cox, Sunrise, FL (US); Ricardo Raimondo, Lauderhill, FL (US); Santiago Contreras, Plantation, FL (US)

(73) Assignee: ACR ELECTRONICS, INC., Fort Lauderdale, FL (US)

( * ) Notice: Subject to any disclaimer, the term of this patent is extended or adjusted under 35 U.S.C. 154(b) by 61 days.

(21) Appl. No.: 15/421,543

(22) Filed: Feb. 1, 2017

Related U.S. Application Data

(60) Provisional application No. 62/290,037, filed on Feb. 2, 2016.

(51) Int. Cl.
| | | |
|---|---|---|
| *H01M 10/00* | (2006.01) |
| *H01M 2/10* | (2006.01) |
| *H01M 2/20* | (2006.01) |
| *H01M 10/42* | (2006.01) |
| *G08B 25/10* | (2006.01) |
| *G08B 29/18* | (2006.01) |
| *B64D 45/00* | (2006.01) |

(52) U.S. Cl.
CPC ............ *H01M 2/105* (2013.01); *B64D 45/00* (2013.01); *G08B 25/10* (2013.01); *G08B 29/181* (2013.01); *H01M 2/204* (2013.01); *H01M 10/4257* (2013.01); *B64D 2045/0065* (2013.01); *H01M 2220/20* (2013.01); *H01M 2220/30* (2013.01)

(58) Field of Classification Search
CPC ........ G08G 5/04; G01S 1/042; H01M 2/1077; H01M 2/1094
See application file for complete search history.

(56) References Cited

U.S. PATENT DOCUMENTS

| | | | | |
|---|---|---|---|---|
| 2012/0263995 A1* | 10/2012 | Naito | ................. | H01M 2/1077 429/146 |
| 2014/0210399 A1* | 7/2014 | Urschel | ..................... | H02J 1/00 320/107 |

\* cited by examiner

*Primary Examiner* — Cynthia H Kelly
*Assistant Examiner* — Monique M Wills
(74) *Attorney, Agent, or Firm* — Malin Haley DiMaggio & Bowen, P.A.

(57) ABSTRACT

An external battery pack for protecting against a battery fire or battery explosion, said battery pack connectable to an emergency locator transmitter (ELT) typically mounted in an aircraft. The external replaceable battery pack has a protective metal enclosure and a removable metal cover. The box includes an aluminum honeycomb grid core mesh with passages, each sized to receive a single battery and a pair of printed circuit boards on top and bottom to receive battery power, voltage and current, from multiple batteries for use with an ELT. By using smaller and more batteries together, the possibility of a catastrophic failure is greatly eliminated or reduced in that a smaller battery have a lesser fire or explosion potential. The batteries are isolated from each other from excessive heat or destruction by explosion.

2 Claims, 6 Drawing Sheets

US 10,236,484 B1

EMERGENCY LOCATOR TRANSMITTER (ELT) WITH SEPARATED OUTSIDE BATTERY PACK FOR SAFETY FROM BATTERY EVENT

CROSS REFERENCE TO RELATED APPLICATIONS

This application claims priority to U.S. Provisional Application No. 62/290,037 filed on Feb. 2, 2016.

BACKGROUND OF THE INVENTION

1. Description of the Invention

This invention relates to an emergency locator transmitter (ELT) that includes a battery pack that is separated physically from the ELT housing for safety in the event of a battery fire or explosion. The invention also provides for a significant reduction in the size of each battery used with the ELT diminishing the effect of a single battery event on the entire system.

2. Description of Related Art

An emergency locator transmitter is a device mounted within an aircraft that provides an emergency RF signal to be transmitted from an aircraft involved in a crash to help search and rescue find the location of the aircraft after the crash. The ELT has a self-contained battery for power. ELTs typically employ lithium batteries. In recent years there have been battery events using lithium batteries. A battery event can be a fire or explosion or both emanating from a single battery. In an aircraft having an ELT, a battery fire or battery explosion could seriously damage an aircraft, endangering lives.

The new battery technology described herein greatly reduces the possibility of damage to an aircraft from a lithium battery event in an ELT. The invention provides for an ELT housing and circuitry separated physically from a replaceable battery pack contained in a protective housing in the event of a battery fire and/or battery explosion. The battery pack also includes the use of smaller individual batteries, each containing less lithium, in order to reduce battery event energy from one individual battery fire or explosion because of the smaller battery containing less material. By using multiple smaller batteries, each battery being separated from each other with protective casings against thermal transfer and explosion results in much greater safety including separation of the battery pack from the ELT functional housing itself. The battery pack described herein can also be used with existing ELTs without any changes to the ELT itself resulting in cost savings.

The battery pack provides various options for different safe configurations: 1) position all the batteries in the pack outside of the ELT housing in a protected enclosure as an ancillary unit or 2) divide up the batteries and position some batteries inside the ELT and some batteries outside the ELT in a separate battery auxiliary unit. Proportioning the number of batteries can also provide a range of possibilities such as using the batteries located inside the ELT housing to power some of the ELT functions while having the batteries in the external protective enclosure to power different ELT functions. The batteries can be rechargeable.

The new battery pack provides a system that protectively isolates batteries from each other and contains an explosion or fire resulting from an individual battery within its own protective compartment. The battery pack also prevents explosion or fire from one battery from igniting or exploding directly another battery within the battery pack. In addition, the battery pack protective enclosure box contains the explosion or fire within the battery pack enclosure itself. The battery pack uses a two phase material system between each battery that prevents the explosive impact from the explosion of one battery from reaching an adjacent battery. This also insulates the battery pack to minimize heat transfer from inside out and from outside in. This greatly increases the safety of using lithium batteries for transportation purposes. The use of smaller batteries decreases the probability of a catastrophic failure by minimizing the magnitude of the explosion to a single battery.

The battery pack can have a vent to safely relieve pressure within the battery pack after such a battery event. Using a separated battery pack allows it to be customized to fit any number of batteries depending on particular application.

SUMMARY OF THE INVENTION

An external separate battery pack for an emergency locator transmitter (ELT) in an aircraft to enhance safety in the event of a battery fire or battery explosion comprising a battery pack metal enclosure box having a removable top metal cover that can be firmly fastened to the metal enclosure box, an aluminum honeycomb grid core mesh with passages in which each of the honeycomb passages are sized in diameter to each receive a single battery, and over mold cast thermal protective material that covers the aluminum honeycomb grid core mesh, a bottom circuit board mounted inside the battery metal enclosure box on the bottom wall of said metal enclosure box, and a top printed circuit board mounted inside the metal enclosure box below the protective cover. The top and bottom printed circuit boards provide circuitry for connecting the multiple batteries (in series or parallel) to provide electrical power to the ELT making up the battery pack disposed within the honeycomb mesh passages, the entire unit creating a battery pack. The battery pack is sized to be mounted next to a conventional ELT housing and mounted on a common tray that holds the ELT and the battery pack together and to an aircraft.

The batteries selected for the battery pack can be smaller in volume and voltage than conventional ELT batteries but using more smaller batteries can achieve the same voltage and current requirements for the ELT, more safely because each battery contains less lithium material to cause a fire or explosion.

DETAILED DESCRIPTION OF THE INVENTION

Figure 1:
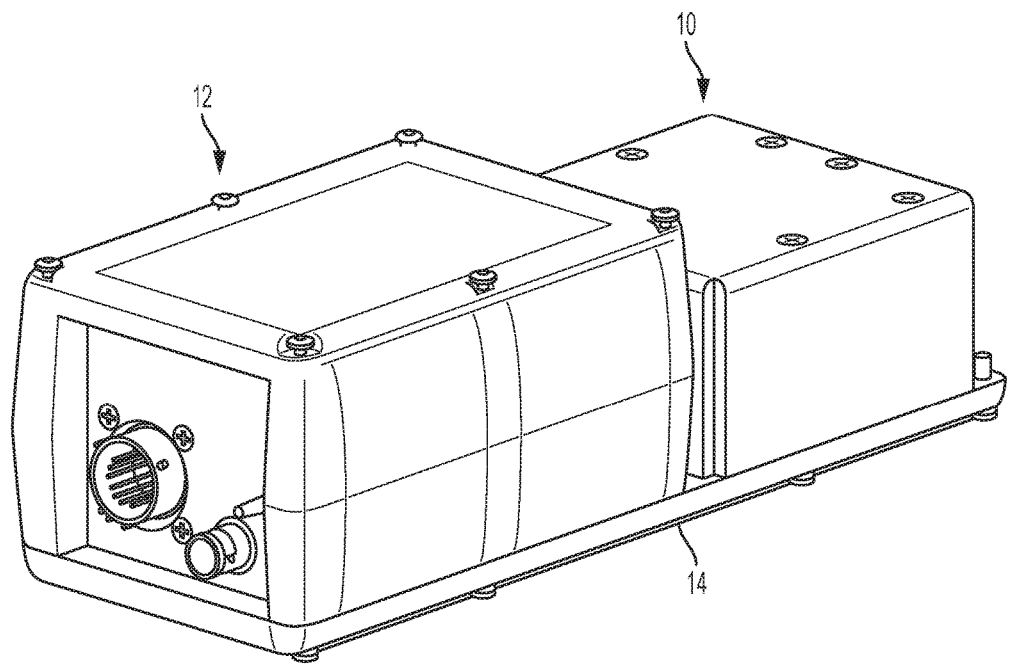
FIG. 1 shows a front perspective view of the external replaceable battery pack in accordance with the invention mounted adjacent an ELT.

Referring now to the drawings and in particular FIG. 1, an external replaceable battery pack is shown as aluminum enclosure box 10 mounted next to a conventional ELT housing 12 that are connected together by an extended flat tray 14 that connects to an aircraft (not shown). A different metal rigid material that is fireproof and explosion proof could be used. However since the devices are used in a commercial aircraft, it is desirable to reduce weight when possible.

Figure 2:
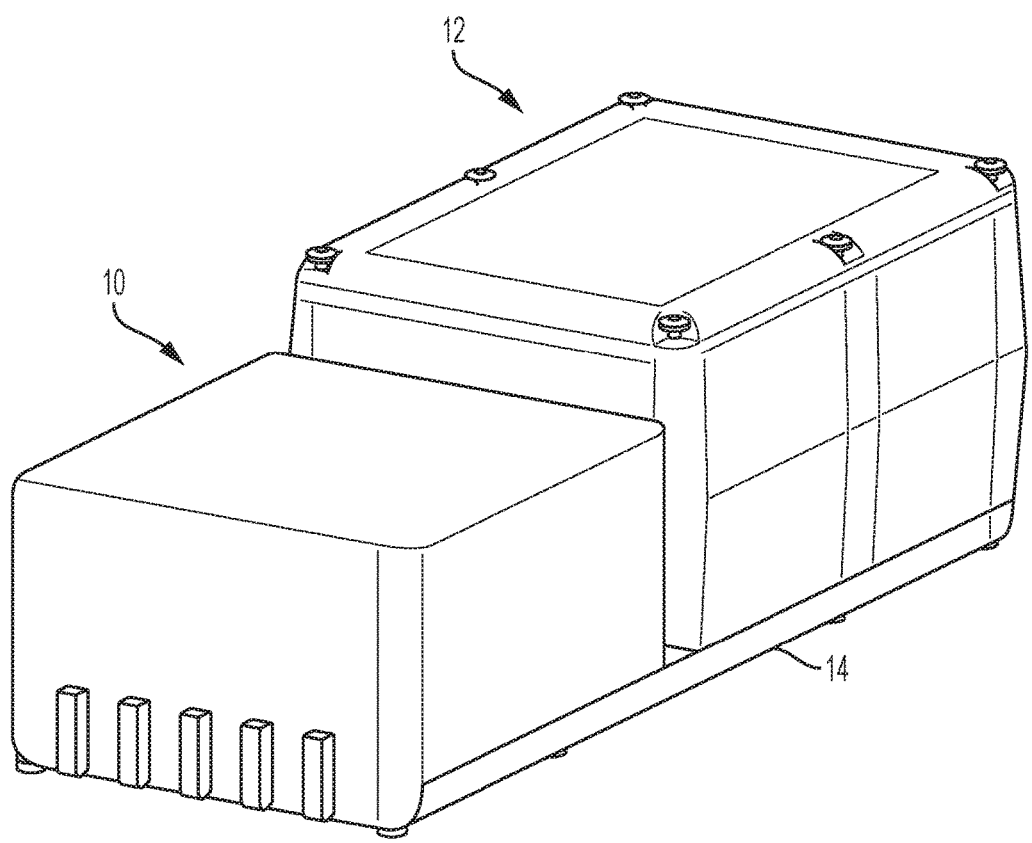
FIG. 2 shows a rear perspective view of the battery pack externally attached to an existing ELT.

FIG. 2 shows the aluminum metal enclosure battery pack box 10 mounted next to conventional ELT 12 circuitry housing (without batteries) and attached using an extended tray 14 that attaches the battery pack protective box 10 to the ELT 12 and to an aircraft, not shown.

Figure 3:
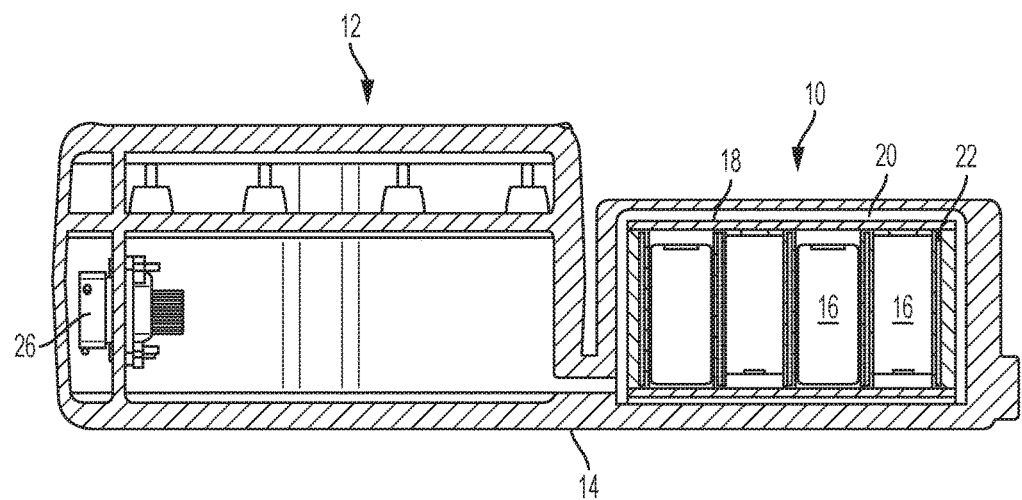
FIG. 3 shows a side elevational view of the battery pack and ELT shown in FIG. 2.
Figure 4:
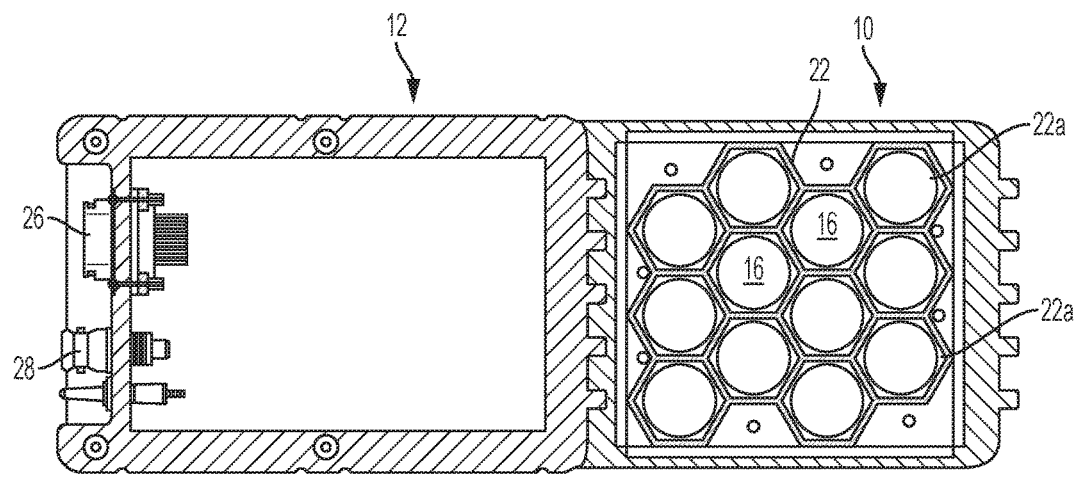
FIG. 4 shows a top plan view of the battery pack and ELT shown in FIG. 2.

FIG. 3 and FIG. 4 show cross-sectional views of the battery pack protective box 10 and its interior as disposed next to conventional ELT 12. A plurality of batteries 16 are mounted inside an aluminum honeycomb grid core mesh 22 described below. The honeycomb mesh 22 is covered by material from an over mold cast with the aluminum honeycomb mesh 22 for additional structure and to increase thermal heat transfer. In the particular embodiment shown in FIG. 4, note that there are honeycomb passages 22a used for receiving batteries 16. The battery pack protective box 10 is made of aluminum metal enclosure walls 20 that completely surround the interior of the battery pack including a removable cover. This provides for protection to the external area around the battery pack honeycomb mesh from a battery event such as fire or explosion. A pair of printed circuit boards 18 are mounted in the top and the bottom of the aluminum metal enclosure protective box 10 that allow the battery circuitry to provide battery power to the ELT using power connector plug 26 and antenna plug 28 that receive the connecting cables from the ELT. The internal honeycomb mesh 22 described below allows for individual fire protection of each battery 16 from an adjacent battery and from explosion so that in the event one battery has a fire or explodes, it will not affect the surrounding batteries. The heat will be dissipated through the honeycomb mesh and overcast material and is also protected from explosions from interfering with an adjacent battery 16.

Figure 5:
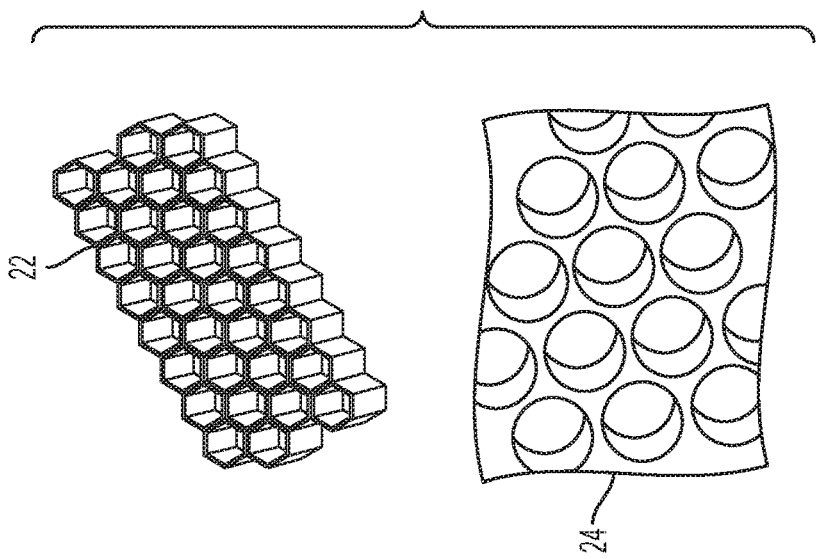
FIG. 5 shows a partial elevational exploded view in cross-section of the battery pack including perspective views of the honeycomb mesh and honeycomb over mold materials.
Figure 5:
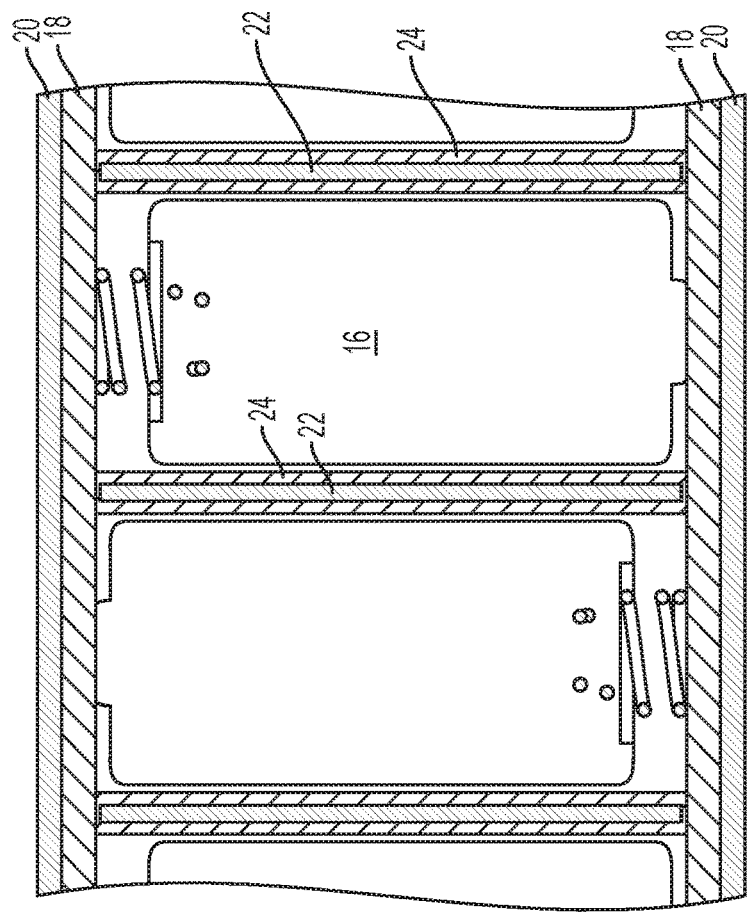

FIG. 5 shows a detailed view of the aluminum honeycomb grid core mesh 22 that itself has an over mold or cast material coating 24. The over mold 24 and the honeycomb mesh 22 is mounted inside the aluminum enclosure box 10 forming the battery pack protective box 10. Inside the protective box 10 on top of the mesh 22 and on the bottom of the mesh 22 are printed circuit boards 18 which are used to provide circuitry so that the total battery voltage and current, either in series or parallel, can be utilized externally and connected to the ELT 12 signal transmission circuitry not shown. Note that the honeycomb mesh 22 and over mold material 24 transfers heat and dissipates any heat caused from an internal explosion or fire from a single battery. Likewise the aluminum honeycomb grid core mesh 22 provides additional barrier strength from explosion from an individual battery. Each honeycomb passage 22a holds a single battery. Also multiple smaller volume batteries can be safely used in a single battery pack, without sacrificing voltage or current, that greatly reduces potential damage from a single battery fire and/or explosion. The smaller volume battery produce a smaller fire and smaller explosion because there is less lithium material in the battery.

Figure 6:
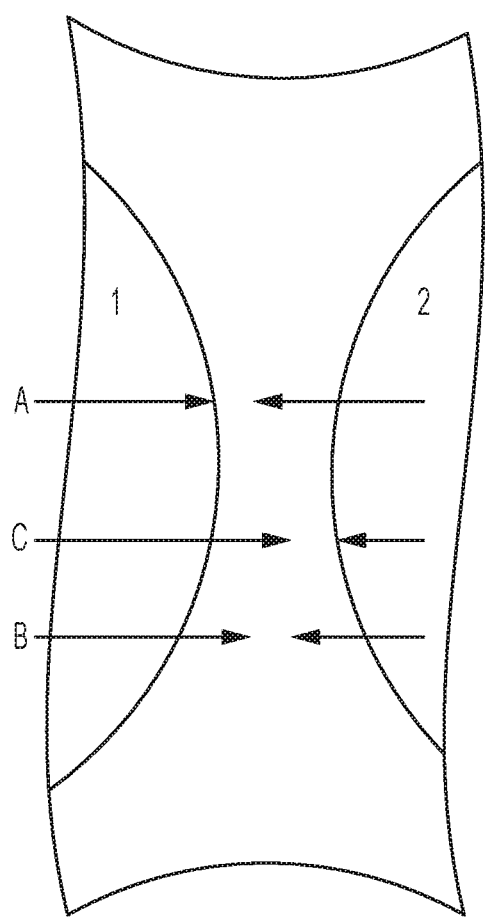
FIG. 6 shows a schematic diagram of the materials honeycomb, over molds wall between battery two battery cells.

FIG. 6 shows that the over molded or cast material A should be a high temperature resistant, low surface energy material A that can survive high temperature explosion while absorbing impact energy. Also shown in FIG. 6 is the schematic view of the protective material A to demonstrate how the batteries are isolated and protected from each other. As shown in the schematic, if the battery in compartment 1 explodes, the over mold material in A absorbs most of the heat and energy. The aluminum honeycomb B maintains the structural integrity of further diffusing the heat, and the other side of the over mold in C remains fully intact and removes the rest of the heat before reaching the battery located in compartment 2.

Figure 7A:
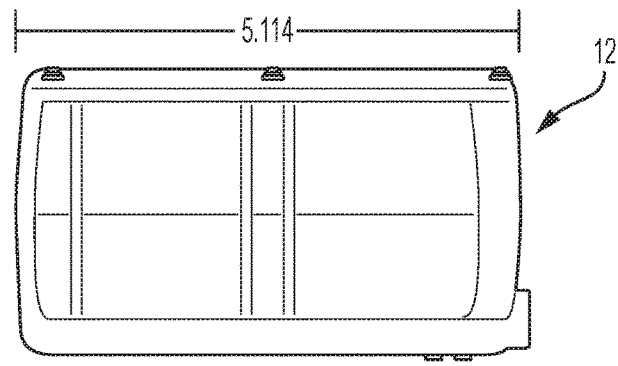
FIG. 7A shows a side elevational view of a conventional ELT.
Figure 7B:
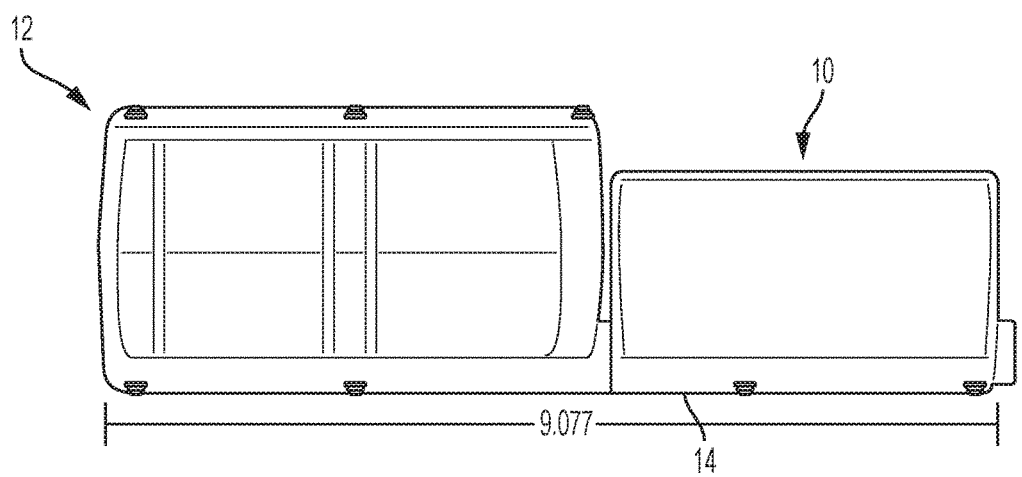
FIG. 7B shows a side elevational view of the conventional ELT coupled to a separate battery pack in accordance with the present invention.

Referring now to FIG. 7A, the size of a conventional ELT housing 12 is represented with its dimensions. FIG. 7B shows the combination of the battery pack 10 in accordance with the present invention joined to the conventional ELT 12 using the extended support tray 14 of the battery pack box which increases the overall length of the combination ELT and battery pack box but not the width or height.

The invention claimed is:

1. An external replaceable battery pack used with an emergency locator transmitter (ELT) comprising:
    a metal enclosure having a top metal removable cover;
    said metal enclosure and said top metal cover forming a protective box for housing batteries;
    aluminum honeycomb grid core mesh sized in length and width and height to fit within said protective box, said honeycomb grid core mesh passages each sized to receive individually a single battery;
    first and second printed circuit boards, said first printed circuit board mounted in the top of said protective box on said honeycomb grid core mesh and said second printed circuit board mounted on the bottom of said protective box engaging said honeycomb grid core mesh, said printed circuit boards used to engage batteries mounted inside said honeycomb grid core mesh for providing battery power using multiple batteries;
    said protective box metal enclosure removeable cover and said aluminum honeycomb grid core mesh internally mounted in said protective box being configured to be fire proof and explosion proof to protect external areas around the outside of protective box from an internal fire and/or explosion inside said protective box caused by lithium batteries;
    ELT in a separate housing without batteries;
    flat tray connected to said enclosure box and to said ELT next to said enclosure box and connectable to an aircraft, and
    said batteries in said enclosure box electrically connected to said ELT circuitry to power said ELT.

2. An external replaceable battery pack used with a ELT as in claim 1, wherein:
    said battery pack includes 12 batteries, reducing the size of each battery necessary to power said ELT.

* * * * *